(12) United States Patent
Watanabe et al.

(10) Patent No.: US 6,295,142 B1
(45) Date of Patent: Sep. 25, 2001

(54) SEMICONDUCTOR APPARATUS AND METHOD FOR PRODUCING IT

(75) Inventors: Minoru Watanabe; Chiori Mochizuki, both of Sagamihara; Takamasa Ishii, Atsugi, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/386,343

(22) Filed: Aug. 31, 1999

(30) Foreign Application Priority Data

Sep. 1, 1998 (JP) .................................................. 10-247217
Aug. 23, 1999 (JP) .................................................. 11-235768

(51) Int. Cl.$^7$ ....................................................... H04N 1/04
(52) U.S. Cl. ........................... 358/482; 358/304; 358/308; 358/483; 345/100
(58) Field of Search .............................. 345/100, 94, 212, 345/58, 98, 74, 208, 54, 55; 358/482, 304, 308, 483, 453, 513, 218, 303, 307

(56) References Cited

U.S. PATENT DOCUMENTS

| | | | |
|---|---|---|---|
| 4,857,751 | 8/1989 | Hatanaka et al. | 250/578 |
| 4,884,079 | * 11/1989 | Inoue et al. | 346/11.1 |
| 4,929,099 | * 5/1990 | Graham et al. | 400/76 |
| 5,073,828 | 12/1991 | Yamada et al. | 358/482 |
| 5,124,768 | * 6/1992 | Mano et al. | 357/23.7 |
| 5,434,599 | * 7/1995 | Hirai et al. | 345/100 |
| 5,567,956 | 10/1996 | Yamanobe et al. | 257/55 |
| 5,619,221 | * 4/1997 | Hirai et al. | 345/58 |
| 5,646,643 | * 7/1997 | Hirai et al. | 345/100 |
| 5,680,229 | 10/1997 | Yamanobe et al. | 358/482 |
| 6,111,625 | * 8/2000 | Ohta et al. | 349/141 |
| 6,163,386 | * 12/2000 | Kobayashi et al. | 358/482 |

FOREIGN PATENT DOCUMENTS 11-2357-68 * 8/1999 (JP) .

* cited by examiner

Primary Examiner—Charles Bowers
Assistant Examiner—Laura M. Schillinger
(74) Attorney, Agent, or Firm—Fitzpatrick, Cella, Harper, & Scinto

(57) ABSTRACT

In order to prevent a decrease of yield due to a discontinuity of a wire or a short between upper and lower metal wires in production of a TFT matrix panel having pixel capacitors and TFTs and produce the TFT panel in a good yield without decrease of an aperture rate of the pixel capacitor portions even with increase in the size of the panel and with micronization of the pixel pattern, ends of bias lines on the opposite side to connection to a common electrode driver for application of bias are electrically connected to each other by a redundant wire.

4 Claims, 19 Drawing Sheets

SEMICONDUCTOR APPARATUS AND METHOD FOR PRODUCING IT

BACKGROUND OF THE INVENTION

1. Field of the Invention

The present invention relates to a semiconductor apparatus and a method for producing it and, more particularly, to a semiconductor apparatus having a thin film transistor (TFT) matrix panel, which is suitably applicable, for example, to formation of a liquid crystal display apparatus or a photoelectric conversion apparatus, and a method for producing it.

2. Related Background Art

It has been a widespread practice heretofore to construct a display unit of a display device such as a liquid crystal panel or the like or a reading unit of a photoelectric conversion device such as an area sensor of a lot of display pixels or reading pixels arrayed in an X-Y matrix and to carry out signal input to each pixel or signal reading from each pixel by an X-Y matrix driving method via TFT provided for each pixel. The display pixels of the display device can be constituted using a liquid-crystal display element in which the liquid crystal is interposed between a pair of electrodes at least one of which is transparent, and the reading pixels of the photoelectric conversion device can be constituted using a photoelectric conversion element in which a semiconductor photoelectric conversion layer is interposed between a pair of electrodes.

Such TFT panels having the matrix array of TFT-provided pixels are increasing their size quickly in recent years. This tendency is due to development in the production technology of liquid-crystal display apparatus using the TFT panel and utilization of the area sensor having the photoelectric conversion element in various fields (for example, application to X-ray image pickup apparatus). Together with this size increasing tendency, micronization is proceeding of array pitches of the pixel pattern. With these panel increasing tendency and pixel micronization tendency, decrease is encountered in the yield in TFT panel production steps. Conceivable reasons are as follows:

(1) a wiring distance per panel has been increasing with progress in the size increasing tendency of the panel, and a discontinuity probability becomes higher therewith;

(2) the area of TFTs and wiring cross portions per panel has been increasing with progress in the micronization tendency of the pixel pattern of panel, and a short probability thus becomes higher between upper and lower metal wires;

(3) electrostatic damage (ESD); specifically, the area capable of contacting the outside has been increasing with the size increasing tendency of panel, so as to increase the quantity of static electricity generated, which results in increasing the probability of occurrence of failure due to ESD.

Increase of yield can be secured by solving these technological issues. Among these reasons, however, (1) can be solved by increasing the wiring width, whereas (2) can be solved by decreasing the area of cross portions between the upper and lower metal wires, i.e., by decreasing the wiring width of the cross portions to the contrary. The increase in the thickness of wiring results in increasing the wire-to-wire capacitance established between the upper and lower metal wires and in turn lowering the sensitivity of transferred signals. It is also conceivable to accomplish the increase of yield by forming a redundant circuit, but the problem of the decrease of sensitivity can also arise in certain cases where an aperture rate of pixel capacitor portions is decreased because of the redundant circuit. As described above, the design of wiring width is now extremely difficult.

FIG. 1 shows an example of equivalent circuitry of a TFT matrix panel.

In FIG. 1, reference numeral 1 designates a TFT matrix panel in which TFTs (thin film transistors) 3 are arrayed in a matrix, 4 capacitors or photoelectric conversion elements (which are indicated as capacitances of photodiodes or the like, capacitances of MIS (Metal Insulator Semiconductor) type photosensors, or capacitances of charge storage capacitors combined with photoconduction type photosensors herein), 5 transfer lines (Sig lines) for transferring signals, 6 bias lines (Vs lines), 7 gate lines (Vg lines), 11 a signal processing circuit having an amplifier, 12 a common electrode driver, 13 a gate driver, and R1, R0 respective wire resistances, A a discontinuity portion, and B a short portion.

In FIG. 1, $C_{11}, C_{12}, \ldots, C_{21}, C_{22}, \ldots, C_{5n}$ each denote the capacitors or photoelectric conversion elements 4, $t_{11}, t_{12}, \ldots, t_{21}, t_{22}, \ldots, t_{5n}$ the TFTs 3, $V_{s1}, V_{s2}, \ldots, V_{s5}$ the bias lines 6, and Dr.1, Dr.2, . . . , Dr.n gate drivers corresponding to the respective gate lines.

In the semiconductor apparatus illustrated in FIG. 1, the plurality of TFTs (t11 to tmn) 3 arrayed in the matrix are driven by a bias voltage supplied from Dr.1 to Dr.n of the gate driver 13 to the plurality of gate lines 7 (for example, Cr (chromium) wires), and electric signals obtained by the photoelectric conversion elements coupled with the respective TFTs forming the respective pixels are transferred from the first electrode of the photoelectric conversion elements c11 to cmn through the plurality of transfer lines 5 (for example, Al (aluminum) wires) to the signal processing circuit 11, thereby effecting signal reading from each matrix element or pixel.

The second electrodes of the photoelectric conversion elements (c11 to cmn) are connected to the plurality of bias lines 6 (for example, Al wires) connected to the common electrode driver 12.

FIG. 2 is an example of a pattern diagram at a corner portion on the opposite side to the bias application side to the bias lines 6 by the common electrode driver 12 in the TFT panel of FIG. 1.

In the production of this TFT panel, when a discontinuity appears in the bias line Vs2, as indicated by symbol A in FIG. 1, the capacitors or photoelectric conversion elements (c22 to c2n) are separated from the common electrode driver 12, and the pixel to which this capacitor or photoelectric conversion element belongs, and the pixels below this defect become defective pixels; a line-shaped defect appears in many cases. When a short circuit occurs between a bias line and a gate line because of attachment of foreign matter or the like, as indicated by symbol B in FIG. 1, defects appear along the bias line and the gate line, because the desired voltage is not applied to the both short-circuited lines. Such occurrence of defects was the cause of decreasing the yield of production.

SUMMARY OF THE INVENTION

An object of the present invention is to provide a semiconductor apparatus that can be produced in a good yield even with increase in the size of panel and with micronization of the pixel pattern, by preventing the decrease of yield due to the discontinuity of wire and the short between the upper and lower metal wires in the production steps of the semiconductor apparatus having the matrix array of pixels, and a method for producing the semiconductor apparatus.

A further object of the present invention is to provide a semiconductor apparatus that can be produced in a good yield without decrease of the aperture rate of the pixel capacitor portions of the semiconductor apparatus having the matrix array of pixels comprised of pixel capacitors and TFTs, and a method for producing the semiconductor apparatus.

Another object of the present invention is to provide a semiconductor apparatus comprising a plurality of pixels arrayed in a matrix, each pixel having a capacitor or a photoelectric conversion element and a thin film transistor connected to the capacitor or the photoelectric conversion element, said capacitor or photoelectric conversion element being comprised of a first electrode and a second electrode, said thin film transistor being comprised of a first main electrode, a second main electrode, and a control electrode for controlling electric conduction between these two main electrodes, said first electrode of said capacitor or photoelectric conversion element being connected to the first main electrode of said thin film transistor in each of said pixels, in which a control electrode line extending in a first direction of said matrix pixel array connects the control electrodes of the thin film transistors of the respective pixels in every pixel line in the first direction, in which a bias line extending in a second direction of said matrix pixel array connects the second electrodes of the capacitors or photoelectric conversion elements of the respective pixels in every pixel line in the second direction, and in which a signal transfer line extending in the second direction of said matrix pixel array connects the second main electrodes of the thin film transistors of the respective pixels in every pixel line in the second direction, wherein an end of said bias line on an opposite side to a connection side to a common electrode driver for applying a bias is electrically connected by a bias redundant wire to an end of another bias line on the opposite side to the connection side to the common electrode driver for applying the bias.

Another object of the present invention is to provide a photoelectric conversion apparatus having pixels arrayed in a matrix and wires for connecting the pixels in a row direction and in a column direction, wherein wires at least in the row or column direction comprise bias lines, each bias line being connected to the pixels on a common basis, said bias lines comprising at least two series of wires for connecting the lines on a common basis.

Still another object of the present invention is to provide a method for producing the above semiconductor apparatus, which comprises such a step that when a short occurs between a bias line and a control electrode line, the said bias line is exposed to laser irradiation on the both sides of the short part to electrically separate the short part from the other portions of the bias line.

Still another object of the present invention is to provide a method for producing the above semiconductor apparatus, which comprises such a step that when a defect occurs in a pixel, the thin film transistor in the said defective pixel is exposed to laser irradiation to electrically separate the said thin film transistor from the capacitor.

DETAILED DESCRIPTION OF THE PREFERRED EMBODIMENTS

Embodiments of the present invention will be described by reference to the accompanying drawings.

EMBODIMENT 1

Figure 3:
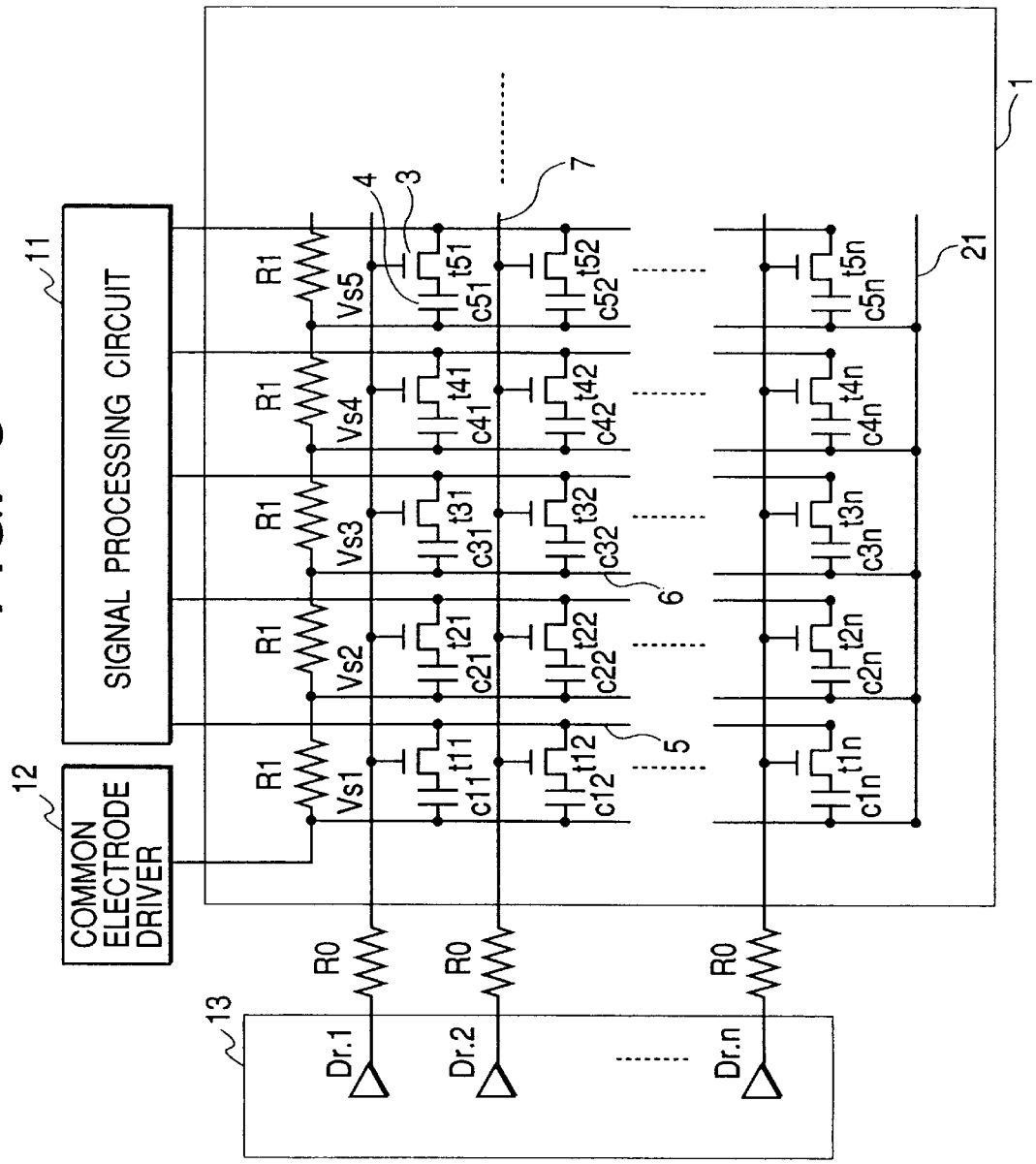
FIG. 3 is a schematic equivalent circuit diagram of an example of the semiconductor apparatus.

FIG. 3 is an equivalent circuit diagram of a TFT matrix panel in Embodiment 1 of the present invention. The present embodiment is an example of application of the TFT panel to the photoelectric conversion apparatus.

Figure 1:
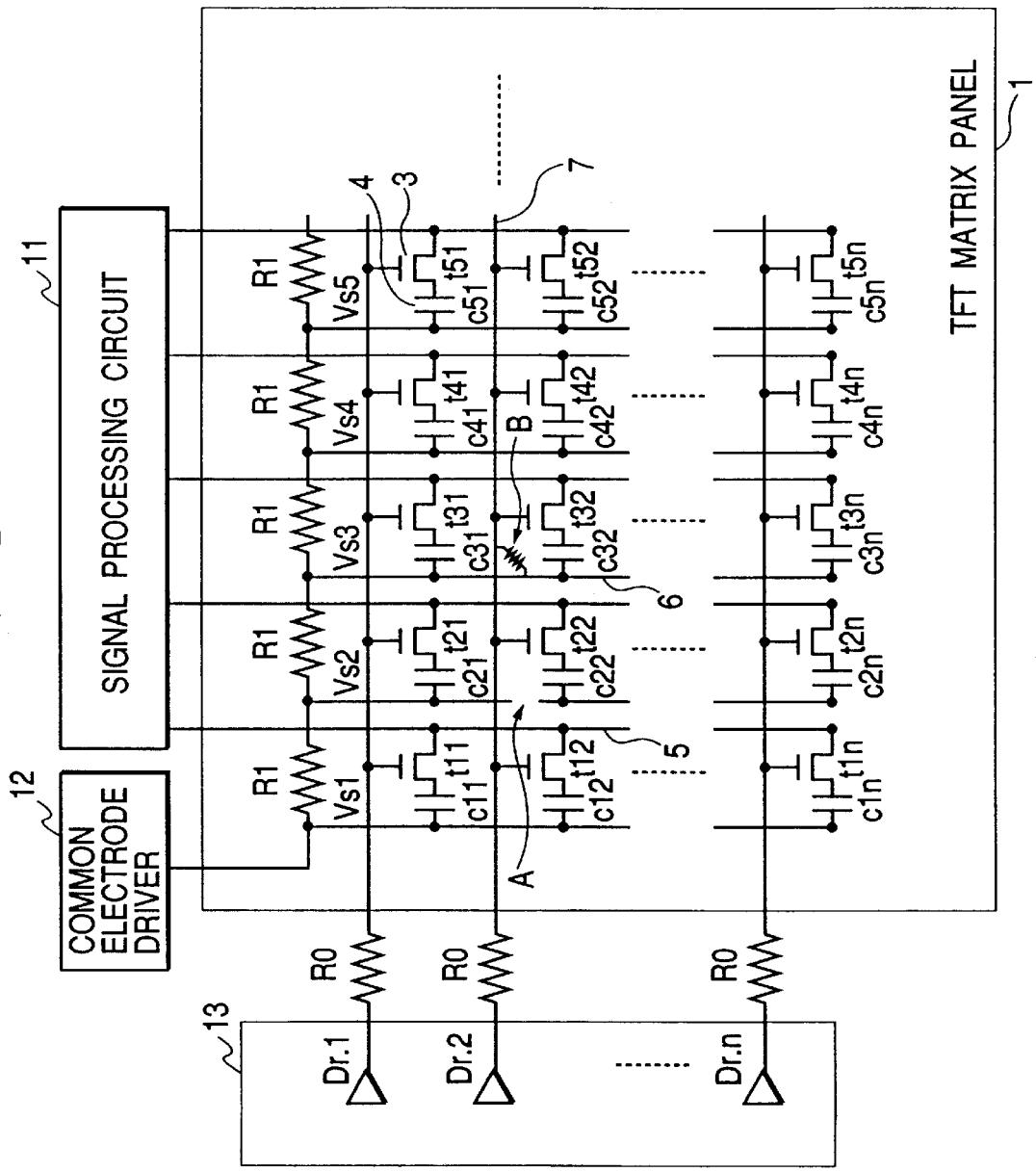
FIG. 1 is a schematic equivalent circuit diagram of an example of the semiconductor apparatus.
Figure 2:
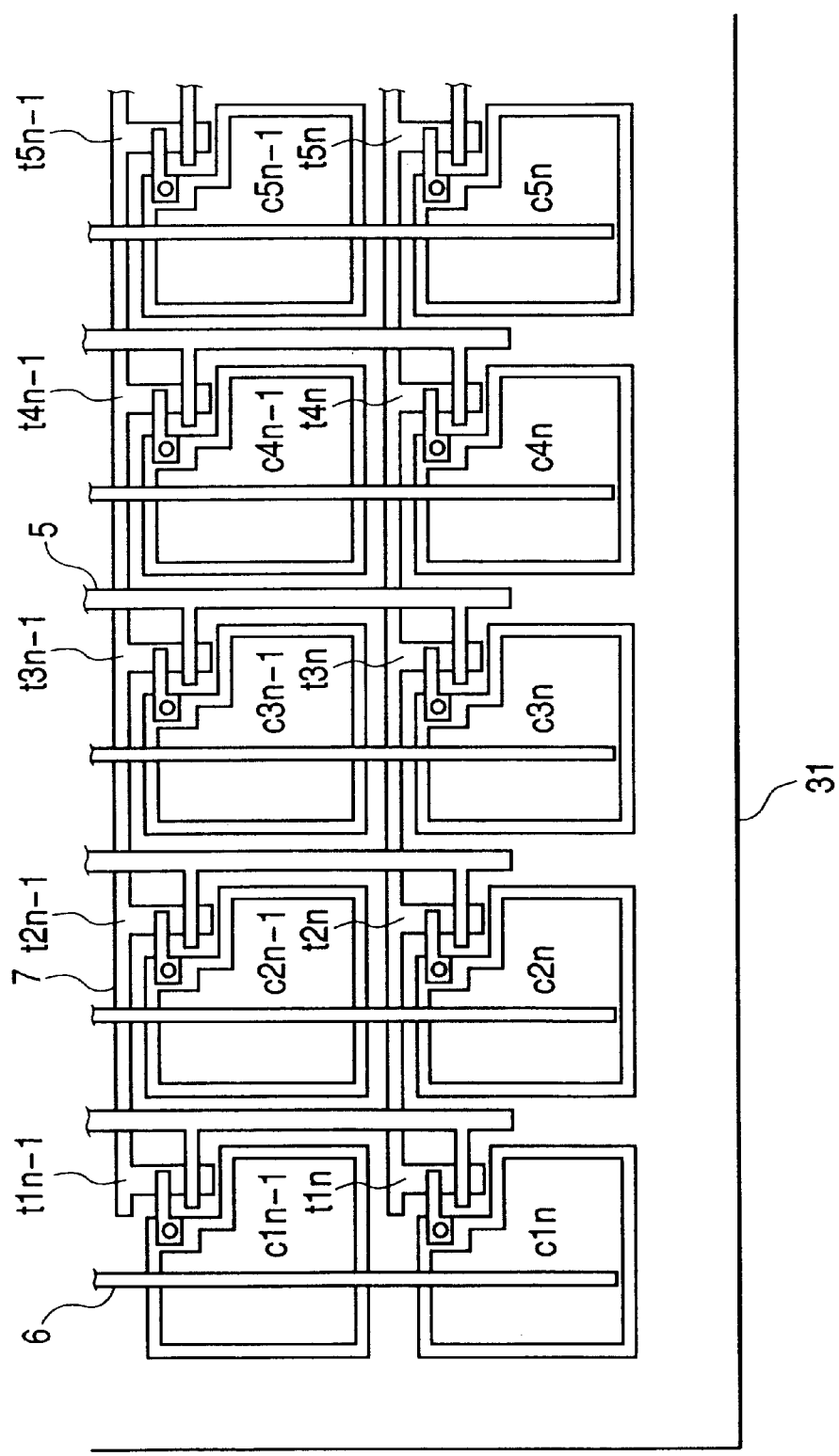
FIG. 2 is a schematic plan pattern diagram for explaining an example of the periphery at a corner of the matrix panel of the semiconductor apparatus.

In FIG. 3 like symbols denote the same or similar members as those in FIG. 1 and the description thereof is omitted herein. In the present embodiment numeral 4 denotes the photoelectric conversion elements. The photoelectric conversion elements suitably applicable are the photodiode type or the MIS type (for example, having the stacked structure composed at least of an electrode, an insulating layer, a semiconductor layer for photoelectric conversion, and an ohmic contact layer (n⁺ type semiconductor layer) on a substrate) photosensors.

In FIG. 3 a redundant wire 21 is provided so as to be common to the bias lines.

Figure 4:
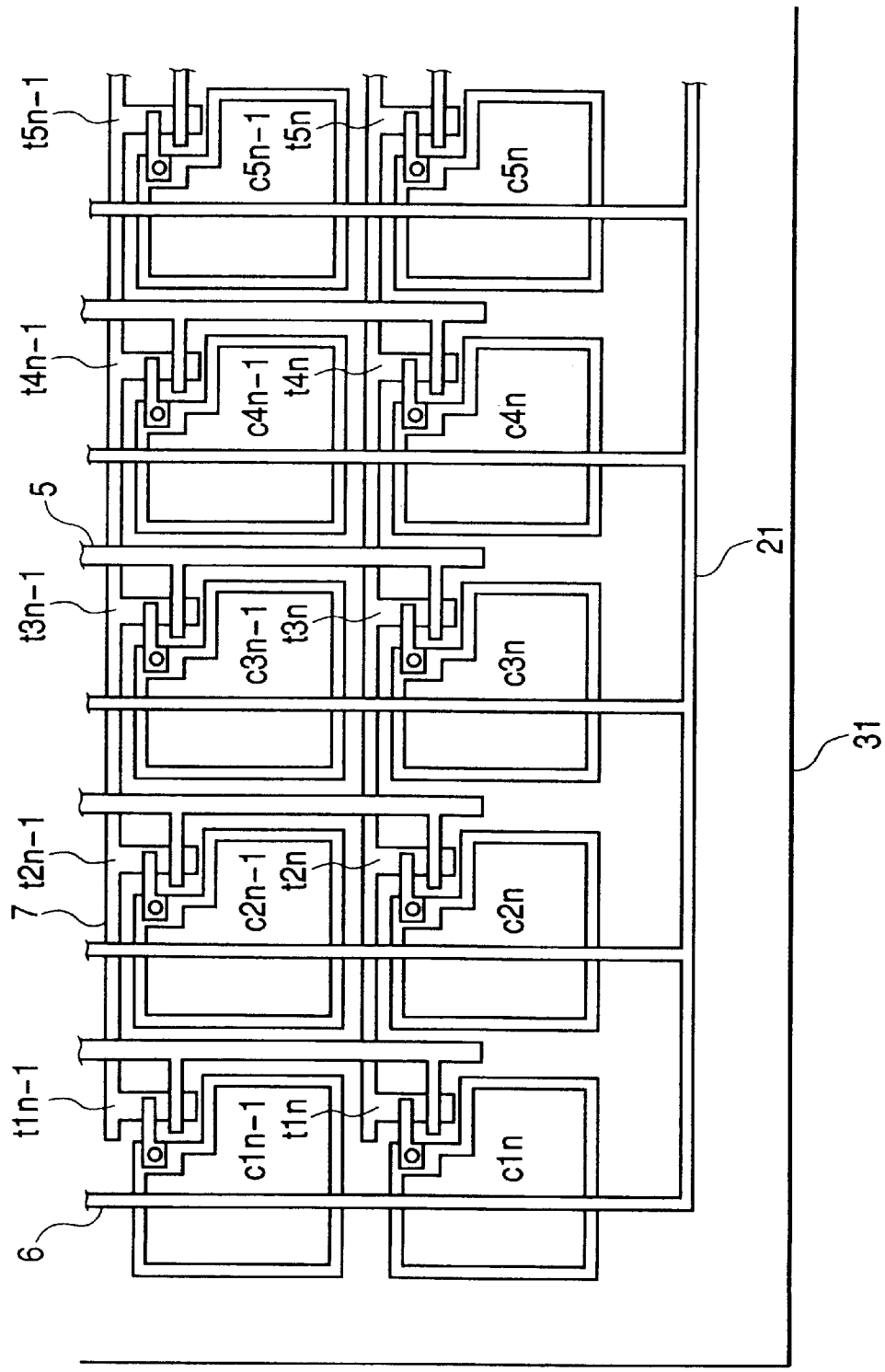
FIG. 4 is a schematic plan pattern diagram for explaining an example of the periphery at a corner of the matrix panel of the semiconductor apparatus.

FIG. 4 is a schematic pattern diagram at a corner part on the opposite side to the bias application side to the bias lines 6 by the common electrode driver 12 in the TFT panel of FIG. 3.

In the present embodiment, as illustrated in FIG. 3 and FIG. 4, the bias lines Vs1, Vs2, Vs3, . . . are electrically connected to each other by the redundant wire 21 at their ends on the opposite side to the connection side to the common electrode driver 12. The redundant wire 21 is located near a panel edge 31 formed when the insulating substrate of the panel is cut.

Figure 5:
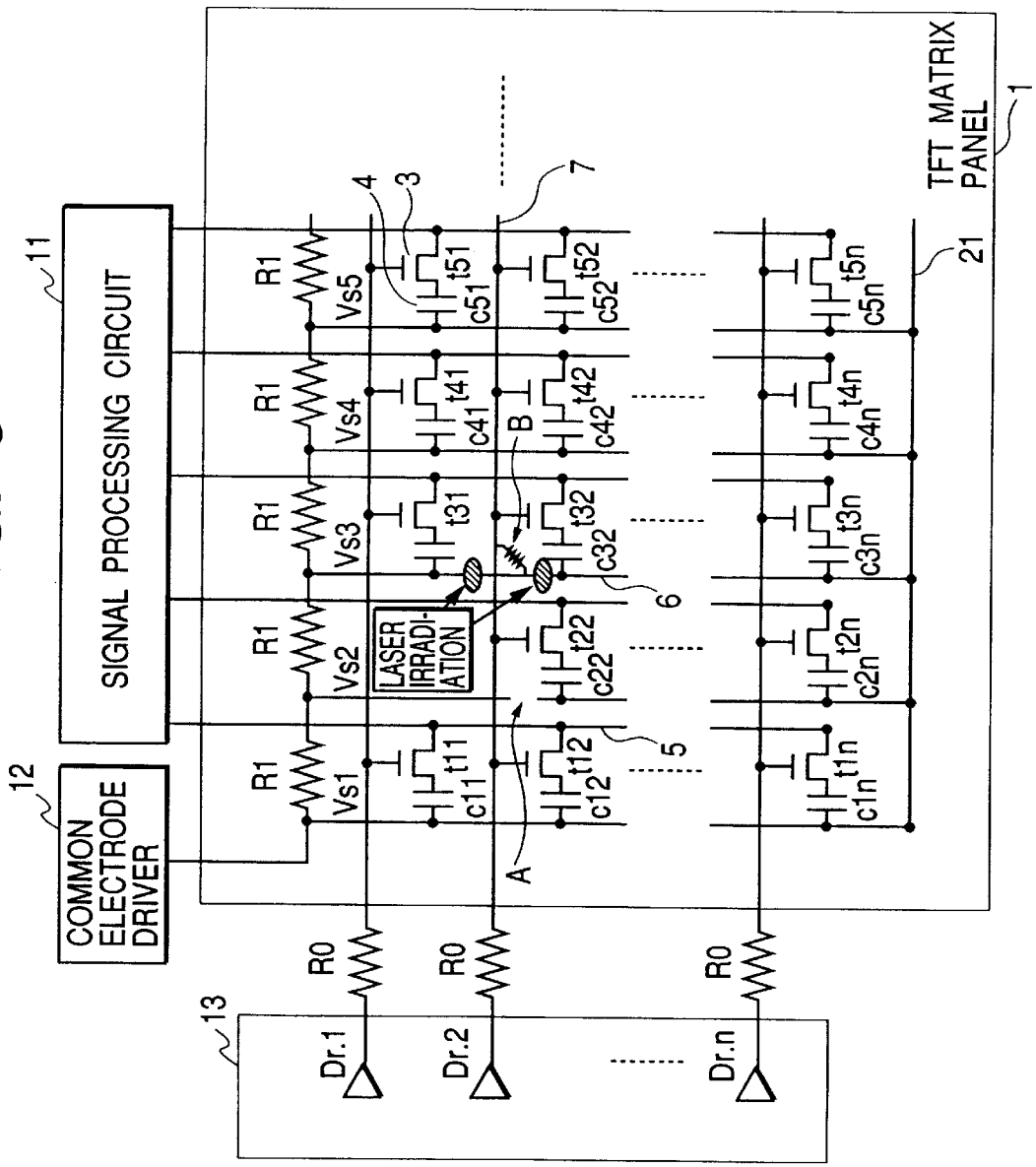
FIG. 5 is a schematic equivalent circuit diagram of an example of the semiconductor apparatus.

FIG. 5 is an equivalent circuit diagram for explaining an example of defects on the occasion of production of the TFT matrix panel and a recovering method thereof in the present embodiment.

If a discontinuity occurs in the bias line Vs2, as indicated by symbol A in FIG. 5, during the production of the TFT panel, the bias will be applied from the other bias lines (Vs1, Vs4, etc.) through the redundant wire 21 to the photoelectric conversion elements c22 to c2n, so that no line defect will appear.

If a defect of the photoelectric conversion element c22 causes a pixel defect, the TFT (t22) of the pixel of interest is exposed to laser irradiation to separate the photoelectric conversion element c22 from its transfer line, thereby preventing an electrical, negative effect.

If a short occurs between the bias line Vs3 and the gate line because of attachment of foreign matter or the like, as indicated by symbol B in FIG. 5, defects will appear in adjacent portions in the bias line direction and in the gate line direction associated with the photoelectric conversion element c32 or in all the pixels in the two directions. In the present embodiment, therefore, the shorted bias line Vs3 is exposed to the laser irradiation on the both sides of the short part to electrically separate the short part from the other portions in the bias line Vs3, thereby preventing the defects due to the short between the bias line and the gate line. Namely, the gate line associated with the photoelectric conversion element c32 is recovered, and the bias is applied to the photoelectric conversion elements c32 to c3n through the redundant wire 21 from the other bias lines (Vs1, Vs4, etc.), so as to avoid a line defect appearing, though the bias line Vs3 associated with the photoelectric conversion element c32 is handled as a discontinuous line. If the defect of the photoelectric conversion element near the short part causes a pixel defect, the TFT of the defective pixel of interest will be exposed to the laser irradiation to separate the defective photoelectric conversion element from its transfer line, thereby preventing the electrical, negative effect.

As described above, the present embodiment can increase the production yield in such a manner that the redundant wire connected to the bias lines is located near the edge 31 of the insulating substrate of the panel, thereby correcting the defect due to the discontinuity of bias line or the short between the bias line and the gate line, with little decrease of the aperture rate of pixels.

Further, provision of the redundant wire 21 makes it possible to decrease the wire resistance up to each pixel against the applied bias from the common electrode driver.

EMBODIMENT 2

Figure 6:
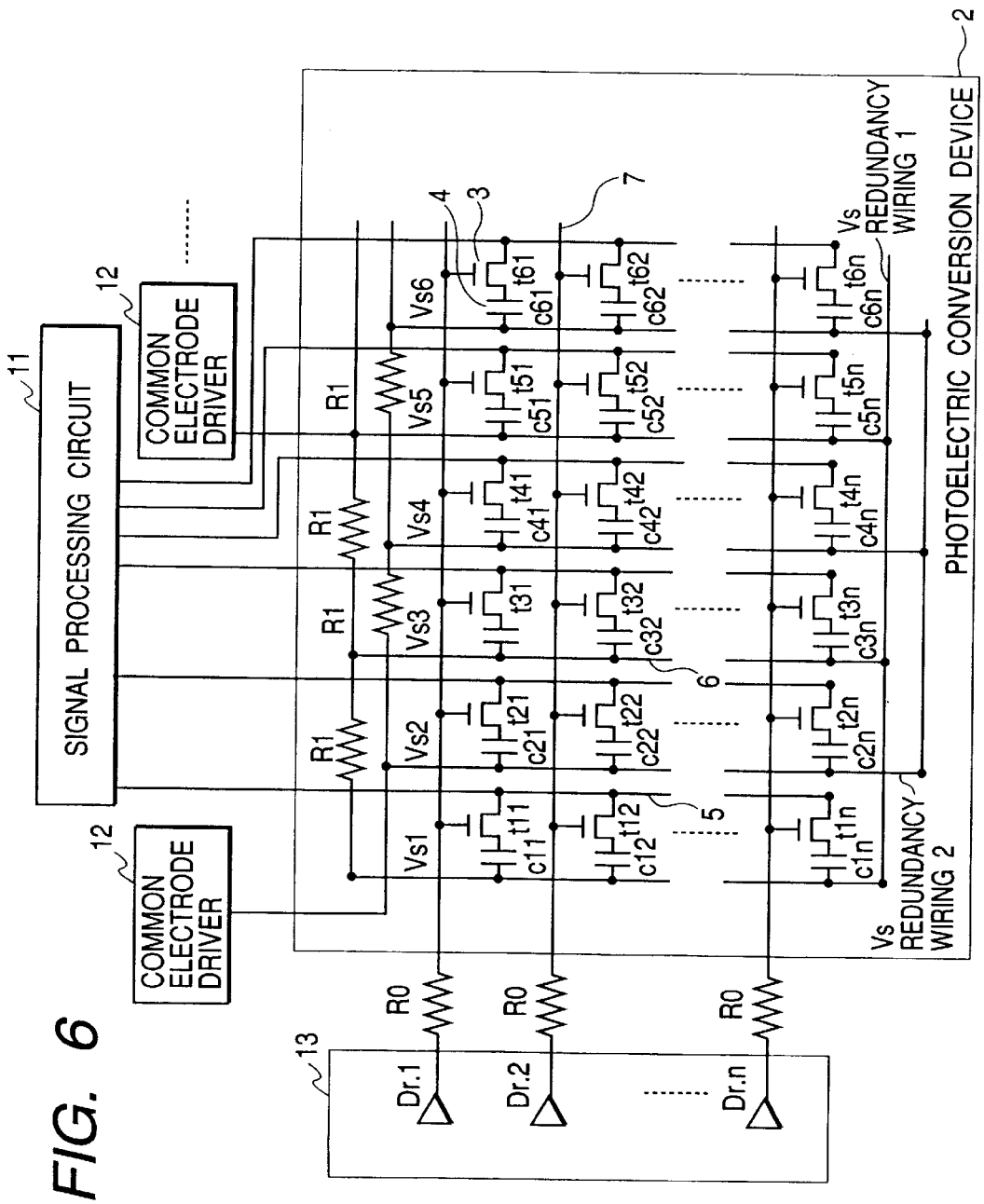
FIG. 6 is a schematic equivalent circuit diagram of an example of the semiconductor apparatus.

FIG. 6 is a schematic equivalent circuit diagram of a TFT matrix panel according to Embodiment 2 of the present invention. The present embodiment is an example of application of the TFT panel to the photoelectric conversion apparatus.

In FIG. 6 reference is made to the description of FIG. 1 as to the same members as those in FIG. 1 and the description thereof is omitted herein.

The present embodiment is identical to the first embodiment in that the second electrodes of the photoelectric conversion elements (c11 to cmn) are connected to the plurality of bias lines 6 connected to the common electrode driver 12, but the present embodiment is different therefrom in that the bias lines 6 are grouped into two series and the bias voltage can be applied to the bias lines 6 in each series from either one of two common electrode drivers 12.

The present embodiment will be described under the assumption that the photoelectric conversion elements are the MIS type sensors. After transfer of signals, electrons stored in the second electrodes of the photoelectric conversion elements (in which capacitors are established) c11 to cmn are eliminated by applying the bias from the common electrode drivers 12 to the n⁺ type semiconductor layer (forming one electrode).

Figure 7:
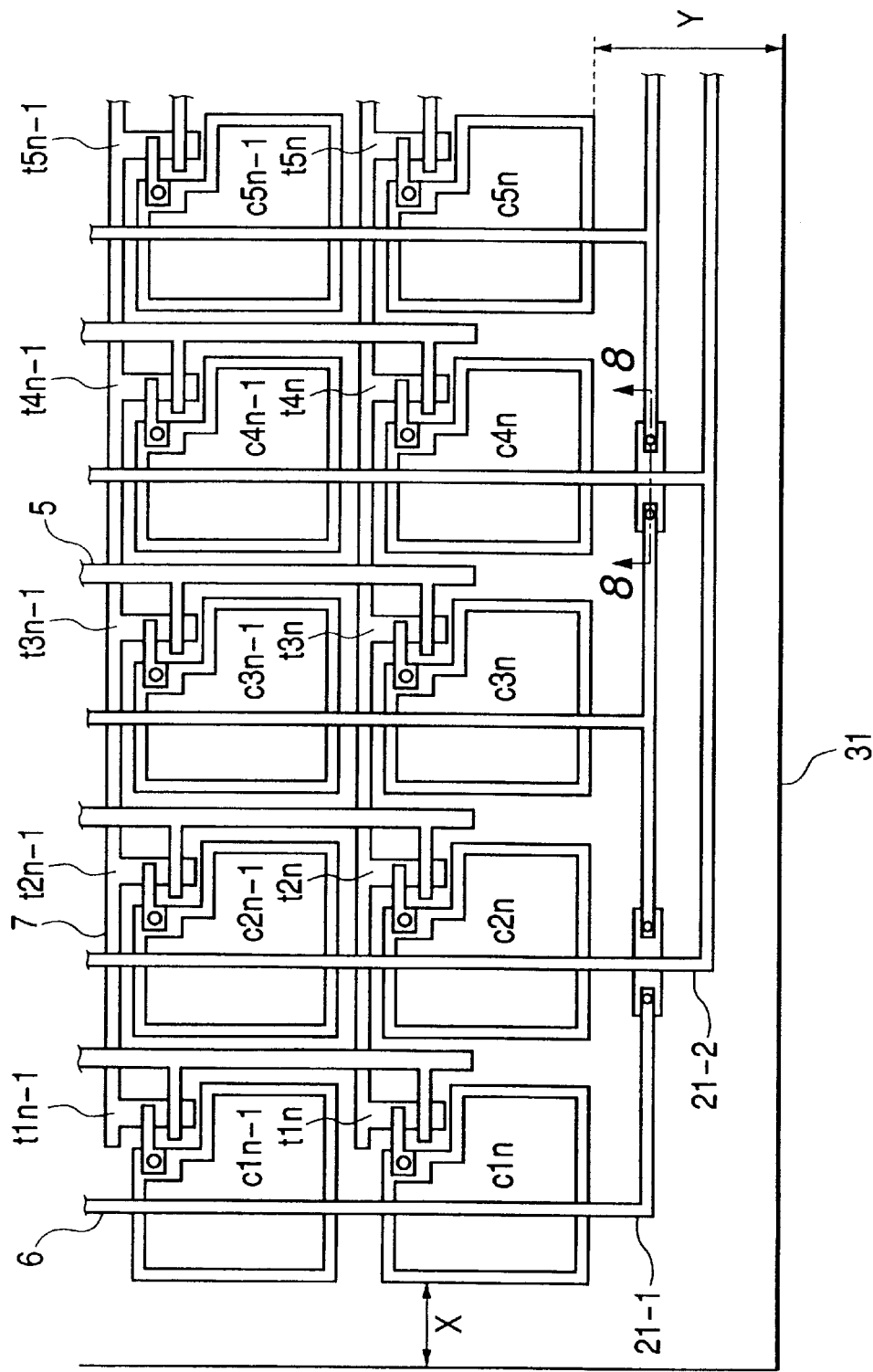
FIG. 7 is a schematic plan pattern diagram for explaining an example of the periphery at a corner of the matrix panel of the semiconductor apparatus.

FIG. 7 is a schematic pattern diagram at a corner part on the opposite side to the bias application side to the bias lines 6 from the common electrode drivers 12 in the TFT panel of FIG. 6.

In the present embodiment, as illustrated in FIG. 6 and FIG. 7, the ends of the respective bias lines are electrically connected to each other by the redundant wires 21-1, 21-2 on the opposite side to the connection side to the common electrode drivers 12. Here the bias lines 6 are grouped into two series, each series is provided with the common electrode driver 12 separately from the other, and the bias lines in each series are connected by the bias redundant wire 21-1 or 21-2. Namely, one end of each of the bias lines in the first series is connected to the first common electrode driver while the other ends thereof are electrically connected to each other by the redundant wire 21-1. One end of each of the bias lines in the second series is connected to the second common electrode driver while the other ends thereof are electrically connected to each other by the redundant wire 21-2.

The redundant wire 21-1 and the redundant wire 21-2 are located near the panel edge 31 formed when the insulating substrate of the panel is cut. If the redundant wire 21-1 and the redundant wire 21-2 are located so that the following relations are satisfied:

$X < P$, $Y < P$ where P is the arrangement pitch of pixels, and X and Y are distances from the edge of the photoelectric conversion elements in the outermost periphery to the panel edge at the time of cutting of the insulating substrate, in cutting parallel to the transfer lines 5 and in cutting parallel to the gate lines 7, respectively, as illustrated in FIG. 7, and if a larger-area photoelectric conversion apparatus is constructed of a plurality of arrays of the photoelectric conversion devices of the present embodiment as units in the X-direction and/or in the Y-direction, increase can be prevented in the spacing between adjacent photoelectric conversion elements of adjacent units.

Figure 8:
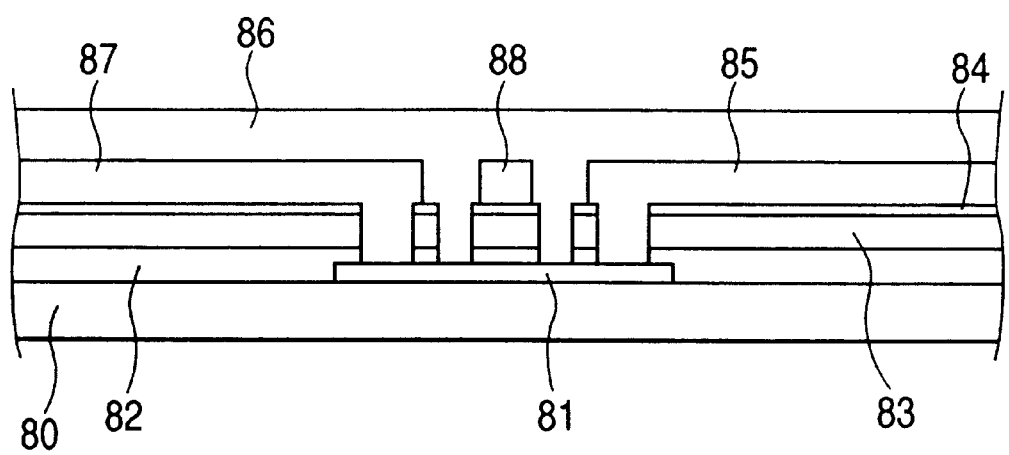
FIG. 8 is a schematic, sectional view for explaining an example of the structure of redundant wires.

FIG. 8 is a cross-sectional view along 8—8 of FIG. 7. In FIG. 8, numeral 80 designates the insulating substrate, 81 a Cr wire layer, 82 an insulating film, 83 an i-type semiconductor layer, 84 an n⁺ type semiconductor layer, 85 an Al wire layer, 86 a protective layer, 87 the redundant wire 21-1, and 88 the redundant wire 21-2. These thin films are formed at the same time as the film-forming process for forming the photoelectric conversion elements and TFTs. Namely, as illustrated in FIG. 8, the redundant wire 21-1 can be formed by making use of the Cr wire metal layer 81 deposited at the same time as the Cr wires forming the gate lines and the Al wire metal layer 85 deposited at the same time as the Al wires forming the bias lines, and the redundant wire 21-2 can be formed by making use of the Al wire metal layer deposited at the same time as the Al wires forming the bias lines. The redundant wire 21-1 and the redundant wire 21-2 are electrically isolated from each other by the insulating film 82 deposited during formation of the photoelectric conversion elements. This permits the redundant wires to be formed without increase in steps of the film-forming process.

Figure 9:
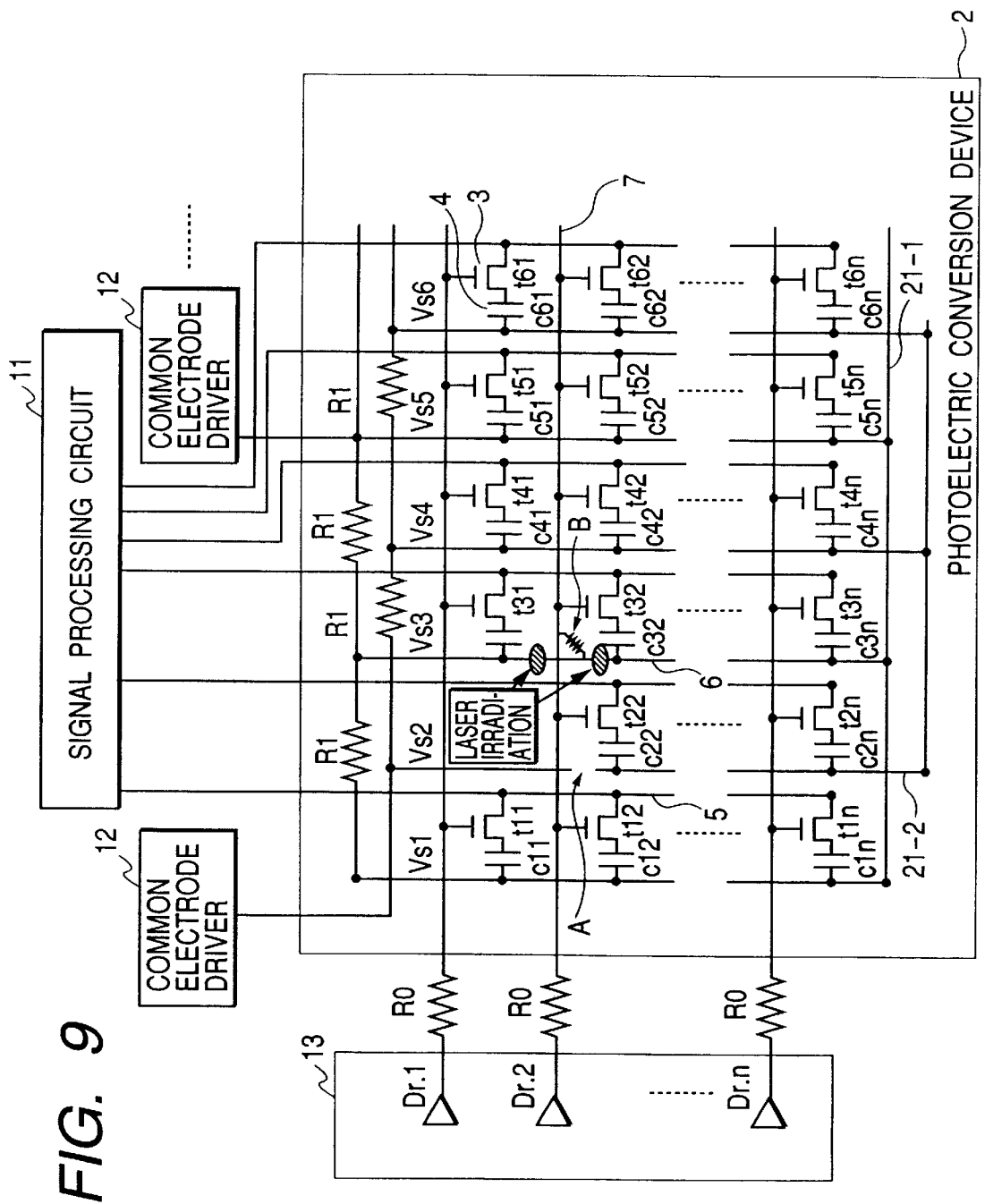
FIG. 9 is a schematic equivalent circuit diagram of an example of the semiconductor apparatus.

FIG. 9 is an equivalent circuit diagram for explaining an example of defects in the production of the TFT matrix panel of the present embodiment and a recovering method thereof.

If in the production of the TFT panel a discontinuity occurs in the bias line Vs2, as indicated by symbol A in FIG. 9, the bias is applied from the other bias lines (Vs4, Vs6, etc.) in the same series through the redundant wire 21-2 to the photoelectric conversion elements c22 to c2n, thereby preventing a line defect.

If the photoelectric conversion element c22 causes a pixel defect, the electric, negative effect can be prevented by exposing the TFT (t22) of the pixel of interest to the laser irradiation to separate the photoelectric conversion element c22 from its transfer line.

If a short occurs between the bias line Vs3 and the gate line because of attachment of foreign matter or the like, as indicated by symbol B in FIG. 9, adjacent portions or the whole will become defective in the bias line direction and in the gate line direction associated with the photoelectric conversion element c32. In the present embodiment the shorted bias line Vs3 will be exposed to the laser irradiation on the both sides of the short part so as to electrically separate the short part from the other portions of the bias line Vs3, whereby the defects can be prevented from occurring because of the short between the bias line and the gate line. Namely, the gate line associated with the photoelectric conversion element c32 is recovered, and no line defect is caused by the photoelectric conversion elements c32 to c3n while the bias is applied thereto through the redundant wire 21-1 from the other bias lines (Vs1, Vs5, etc.) in the same series, though the bias line Vs3 associated with the photoelectric conversion element c32 is handled as a discontinuous line. If the photoelectric conversion element near the short part causes a pixel defect, the TFT of the defective pixel of interest will be exposed to the laser irradiation to separate the defective element from its transfer line, thereby preventing the electric, negative effect.

In the present embodiment, the bias lines are grouped into the two series, the bias is applied from each of the two common electrode drivers 12 to drive the elements separately in each series, and the redundant wire is also connected to the bias lines separately in each series. This permits the photoelectric conversion elements arrayed in the matrix to be driven in the two series. When the resolution in signal reading of one cycle is decreased to half, speed of signal processing can be approximately doubled. This is implemented as follows. In the MIS type photoelectric conversion elements, a dark current appears during a period between application of the bias through the bias lines and reading of signals, and it is thus preferable to carry out "dummy reading" for removal of the dark current and thereafter "real reading" for gaining the objective reading signals. In this case, the signal reading time for one cycle becomes longer, but this can be compensated for as follows.

Figure 10A:
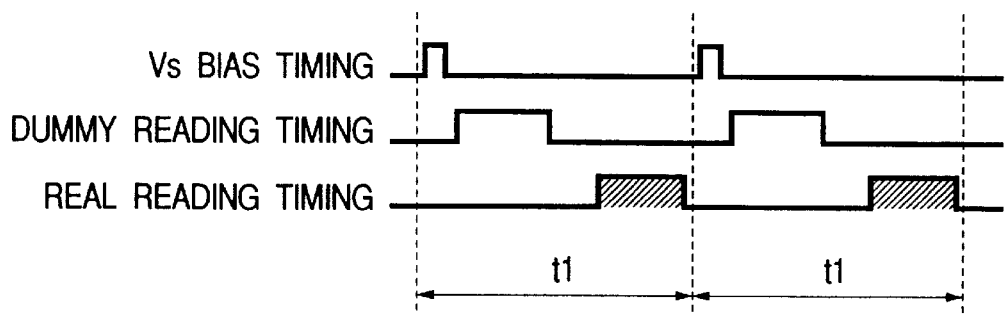
FIG. 10A and FIG. 10B are timing diagrams for explaining examples of driving of the semiconductor apparatus.
Figure 10B:
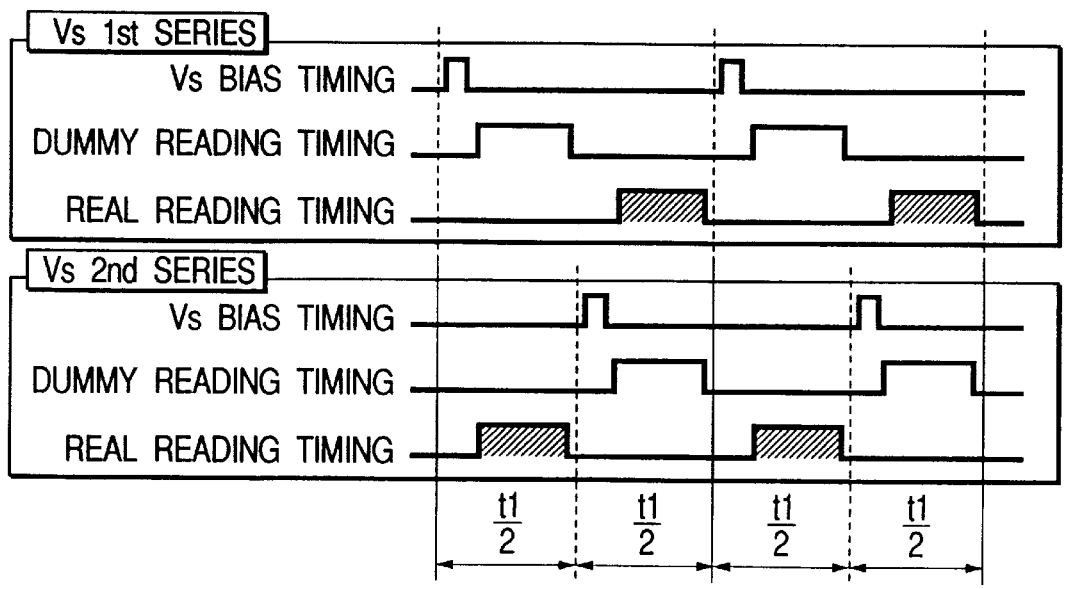

FIG. 10A and FIG. 10B show examples of bias application timing to the bias lines, dummy reading timing, and real reading timing in the case of one series of bias lines and in the case of two series of bias lines, respectively.

FIG. 10A shows the example of one series of bias lines, in which the time t1 is necessary for reading of one cycle. In contrast with it, FIG. 10B shows the example of two series of bias lines, in which the first series and the second series are separately driven by applying the bias at the respective bias timings. Signals from the second series in real reading are obtained during the dummy reading of the first series, whereas signals from the second series in dummy reading are obtained during the real reading of the first series. This permits the signal reading to be carried out in the approximately half time (t1)/2, though the resolution is half.

It is a matter of course that the reading can also be carried out in the same resolution and required time as before, by applying the bias to the two series of bias lines at the same bias timing in the present embodiment.

It is also possible in the present embodiment to enhance the characteristics in such a manner that a plurality of bias applying lines from the common electrode drivers are provided on the insulating substrate and the bias is applied through the plural paths of bias lines, so as to decrease the wire resistance (R1 etc.) from the common electrode drivers to the second electrodes of the respective photoelectric conversion elements and uniform bias waveforms applied to the second electrodes of the photoelectric conversion elements.

Since in the present embodiment the bias redundant wires are also located near the edge 31 of the insulating substrate of the panel, as in Embodiment 1, the production yield can be increased by correcting the defect such as the discontinuity of the bias line or the short between the bias line and the gate line with little decrease in the aperture rate of the photoelectric conversion elements.

In the two embodiments described above, the TFT matrix panel is constructed in the matrix of m×n, and potential configurations are m≧2, n≧1 in Embodiment 1 and m≧4, n≧1 in Embodiment 2.

EMBODIMENT 3

Figure 11:
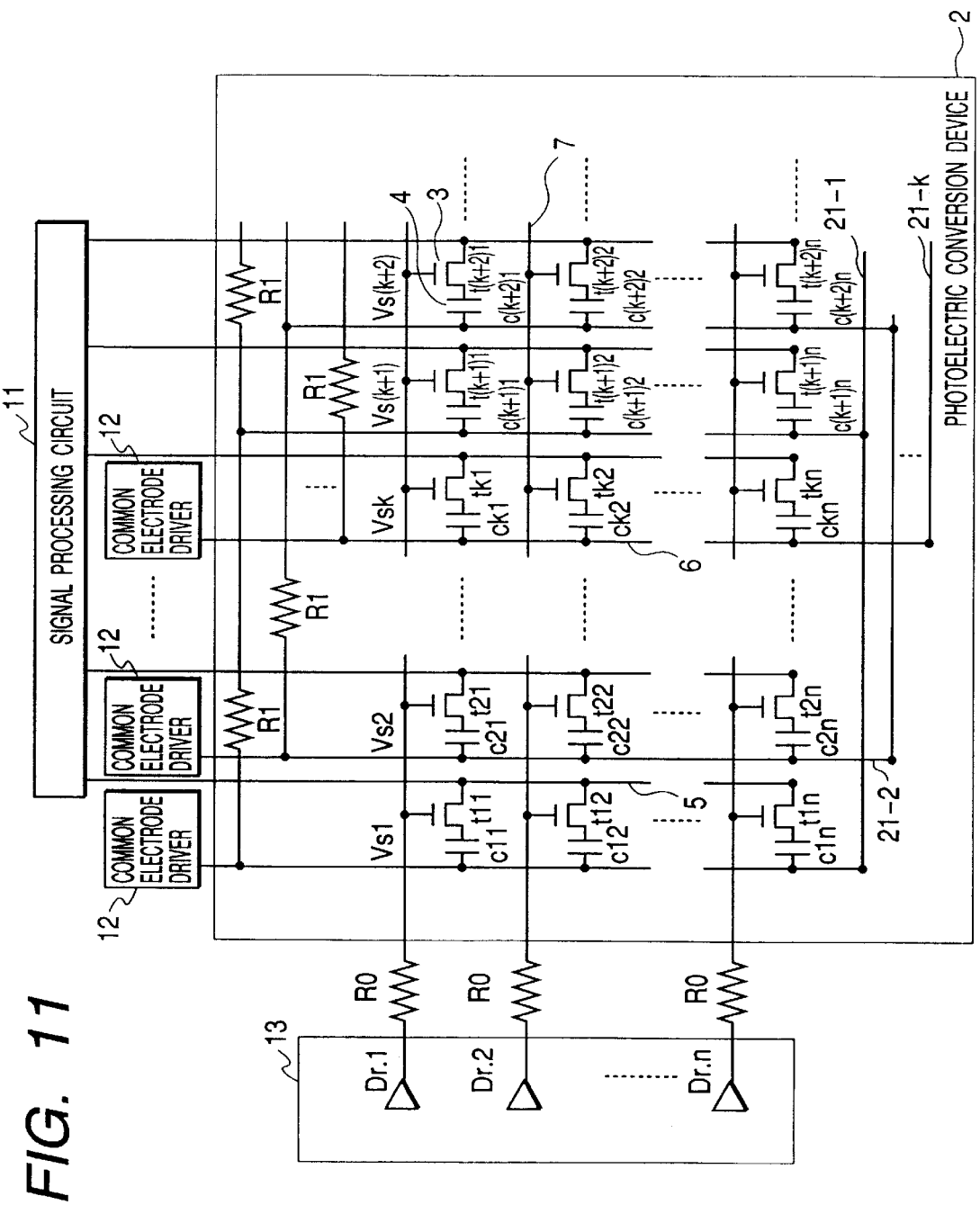
FIG. 11 is a schematic equivalent circuit diagram of an example of the semiconductor apparatus.

FIG. 11 is a schematic equivalent circuit diagram of the TFT matrix panel associated with Embodiment 3 of the present invention. The present embodiment is an example of application of the TFT panel to the photoelectric conversion apparatus.

A plurality of TFTs (t11 to tmn) 3 arrayed in a matrix are driven by the bias supplied from Dr.1 to Dr.n of the gate driver 13 to the gate lines 7, electric signals obtained in the photoelectric conversion elements paired with the TFTs composing the respective pixels are transferred from the first electrodes of the photoelectric conversion elements c11 to cmn through a plurality of transfer lines 5 to the signal processing circuit 11, thereby effecting signal reading from each matrix element or pixel.

The second electrodes of the photoelectric conversion elements (c11 to cmn) are connected to a plurality of bias lines 6 connected to the common electrode drivers 12. In the present embodiment, the bias lines are grouped into a plurality of series and the bias is applied to each series of bias lines by the common electrode driver 12.

The photoelectric conversion elements are the MIS type sensors, and after transfer of signals, electrons stored in the second electrodes of the photoelectric conversion elements c11 to cmn are eliminated by applying the bias from the common electrode driver 12 to the n⁺ type semiconductor layer. This operation will be referred to hereinafter as refresh.

Figure 12:
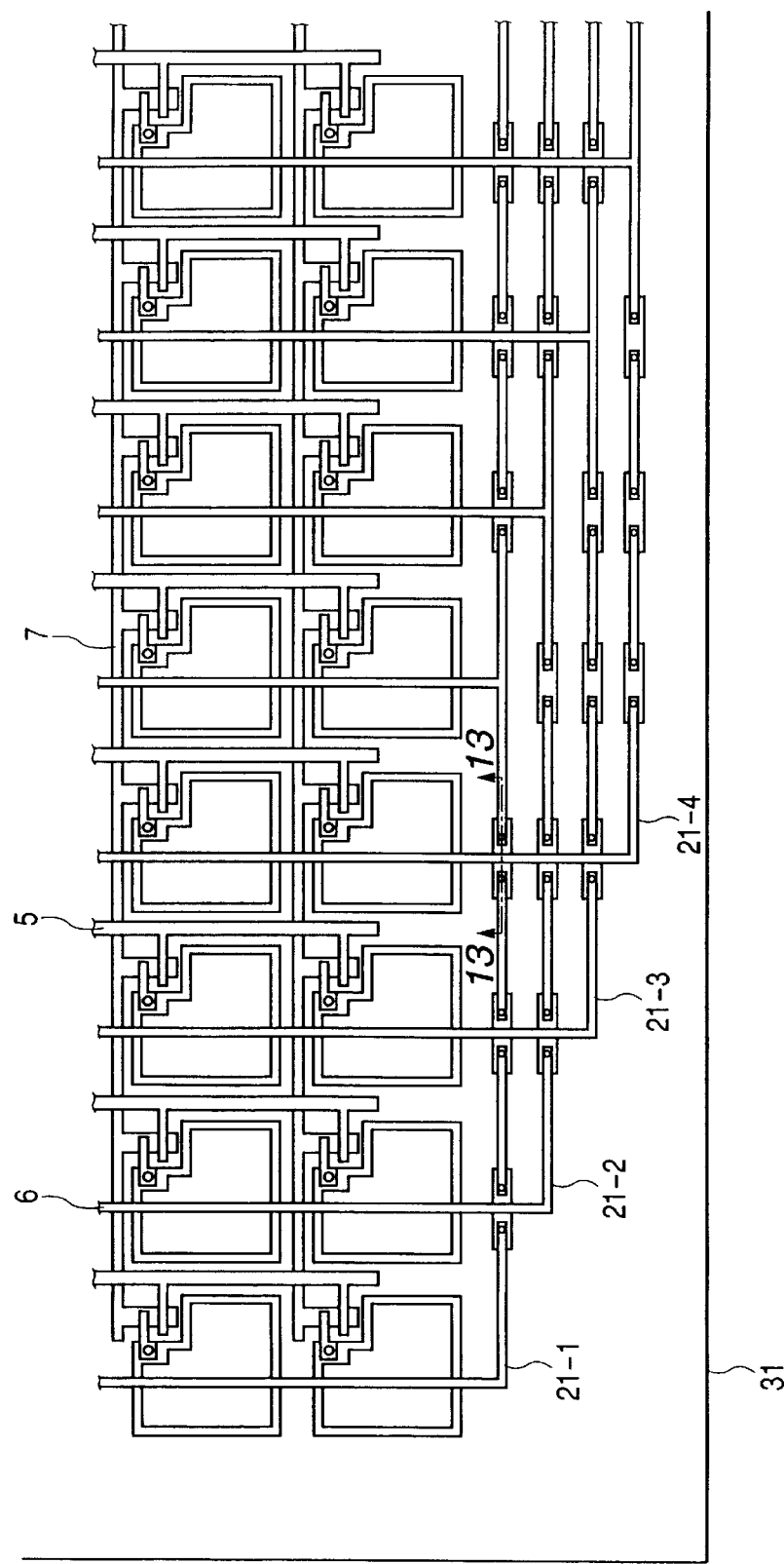
FIG. 12 is a schematic plan pattern diagram for explaining an example of the periphery at a corner of the matrix panel of the semiconductor apparatus.

FIG. 12 is a pattern diagram at a corner part on the opposite side to the bias application side to the bias lines 6 by the common electrode drivers 12 in an example of four series in the TFT panel of FIG. 11.

In the present embodiment, as illustrated in FIG. 11 and FIG. 12, the bias lines are electrically connected to each other by the redundant wires 21-1 to 21-4 at their ends on the opposite side to the connection side to the common electrode drivers 12. Here the bias lines are grouped into a plurality of series (k series) and the bias lines are connected by a redundant wire in each series. Namely, one end of each of bias lines in the first series is connected to a first common driver and the other ends thereof are electrically connected to each other by the redundant wire 21-1. Likewise, one end of each of bias lines in each of the second series to the k-th series is connected to either of the second to the k-th common electrode drivers and the other ends are electrically connected to each other by either of the redundant wire 21-2 to the redundant wire 21-k.

The redundant wire 21-1 to the redundant wire 21-k are located near the panel edge 31 formed when the insulating substrate of the panel is cut.

Figure 13:
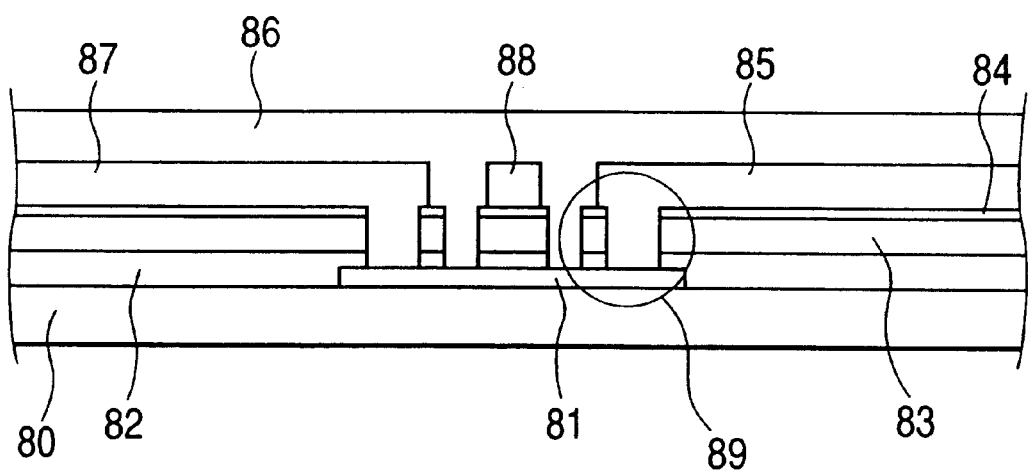
FIG. 13 is a schematic, sectional view for explaining an example of the structure of redundant wires.

FIG. 13 is a schematic cross-sectional view along 13—13 of FIG. 12. In FIG. 13, reference numeral 80 denotes the insulating substrate, 81 a Cr wire layer, 82 an insulating film, 83 an i-type semiconductor layer, 84 an n⁺ type semiconductor layer, 85 an Al wire layer, 86 a protective layer, 87 the redundant wire 1, and 88 the redundant wire 4. The Al wire layer of numeral 85 and the Cr wire layer of numeral 81 are connected via a contact hole (CH) of numeral 89, at which a connection resistance appears.

When there are the k series of bias lines, there exist (k−1) cross portions in the redundant wire 21-1 and the number of contact holes is thus 2(k−1).

Since there exist (k−2) cross portions in the redundant wire 21-2, the number of contact holes CH is 2(k−2). Therefore, the number of contact holes CH differs among the redundant wires.

Let us consider an example of four series here. There are three cross portions in the redundant wire 21-1, two cross portions in the redundant wire 21-2, one cross portion in the redundant wire 21-3, and no cross portion in the redundant wire 21-4. At this time, the wire resistances of the respective series are different, because the contact holes CH have the connection resistance as described previously. The difference in the wire resistance can result in making differences of outputs (particularly, dark outputs), assumed to be due to differences of time constants during refresh, among the series. Since this periodic output difference is easy to perceive, it can be a significant problem in certain cases.

In the present embodiment, as illustrated in FIG. 12, all the redundant wires are thus provided with the cross portions and contact holes CH in the same form and in the same number, so as to equalize the wire resistance, whereby the yield is prevented from being decreased by the discontinuity of wire or the short between the upper and lower metal wires and whereby the characteristics can be uniform in the panel; as a result, S/N of the panel can also be increased.

EMBODIMENT 4

The present embodiment shows an example in which one photoelectric conversion apparatus is constructed of four TFT matrix panels illustrated in FIG. 11.

Figure 14:
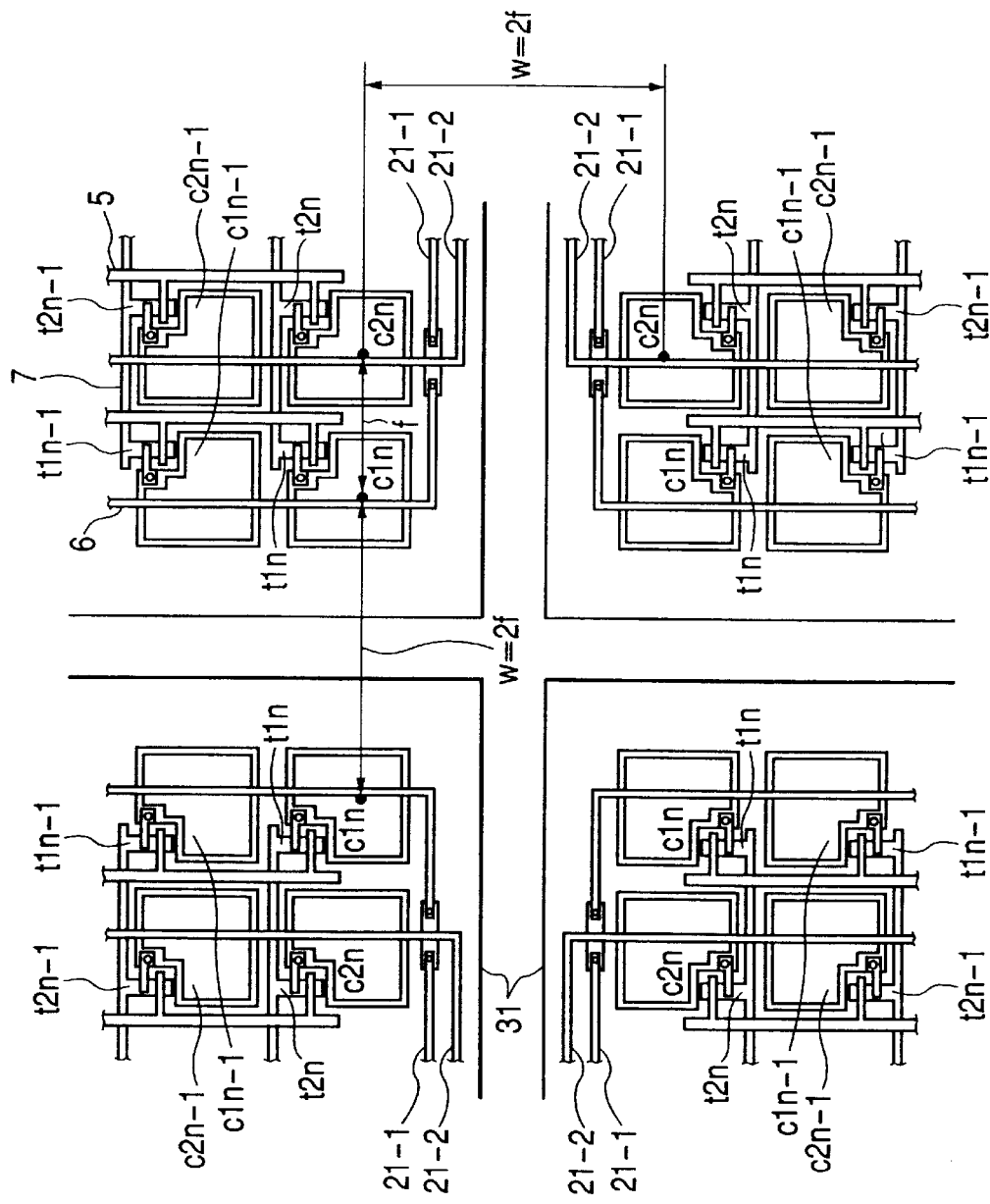
FIG. 14 is a schematic plan pattern diagram for explaining an example of the periphery at corners of the matrix panels of the semiconductor apparatus.

FIG. 14 is a schematic pattern diagram at panel corners where the four TFT panels of FIG. 11 are placed with their corners meeting together.

In Embodiments 1 to 3 the redundant wires are placed near the panel edge and the placement space is necessary at this time. Assuming here that the array pitch of pixels is f, as illustrated in FIG. 14, it is desirable for image correction at joints between the panels to be bonded, that the margin at the joints be equivalent to one pixel, i.e., that the distance w between the pixels located in the outermost periphery of each panel (or between gravity centers of the photoelectric conversion units) be defined as w=2f. The bonding of the panels is carried out on the basis of the gravity centers of the photoelectric conversion units.

Figures 15A, 15B:
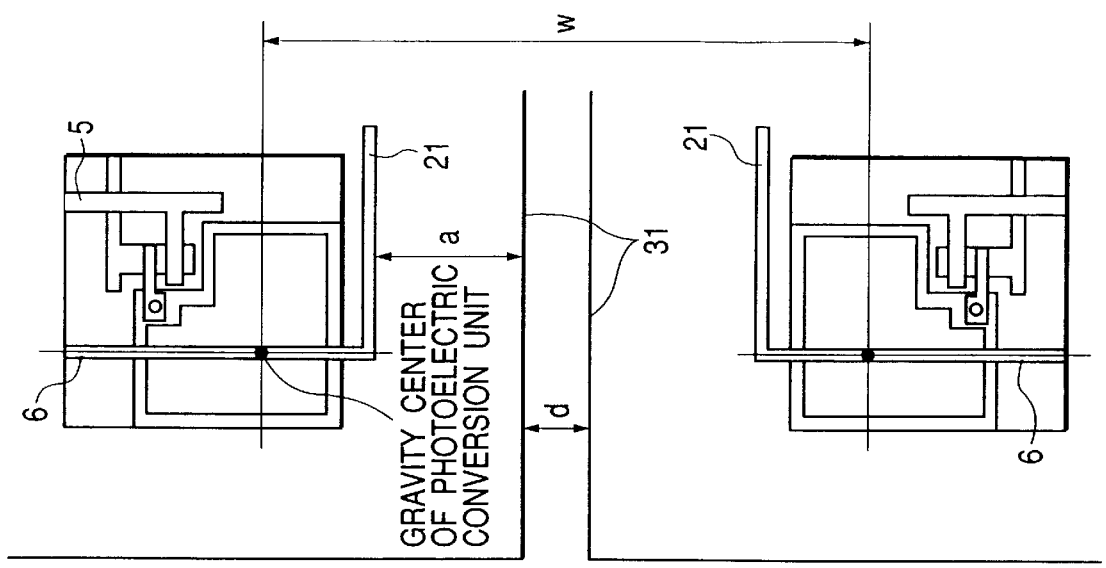
FIG. 15A and FIG. 15B are schematic plan pattern diagrams for explaining examples of the periphery at corners of the matrix panels of the semiconductor apparatus.

FIG. 15A and FIG. 15B are schematic pattern diagrams for explaining the gravity centers of the photoelectric conversion units in the present embodiment.

In the case of FIG. 15A, the gravity centers of he photoelectric conversion units are apart from the panel edges because of the positions of the TFTs or the like. At this time the distance a between the panel edge and the device edge of the devices including the wires is a certain fixed amount necessary in terms of reliability and as a cutting margin. As a result, the distance d is small between the panel edges and the placement of the Vs redundant wire (particularly, in the case of plural redundant wires) can be difficult in certain cases.

In the present embodiment, as illustrated in FIG. 15B, the gravity centers of the photoelectric conversion units are placed closer to the panel edges, for example, by locating the TFTs at positions apart from the panel edges, or the like. This allows the distance d to be set larger, even if a is specified at the certain fixed amount. As a result, even with a plurality of Vs redundant wires, a sufficient area for placement of all the wires can be secured without change of word; that is, the sufficient distance a can be provided between the panel edge and the device edge of the devices including the wires.

EMBODIMENT 5

Figure 16:
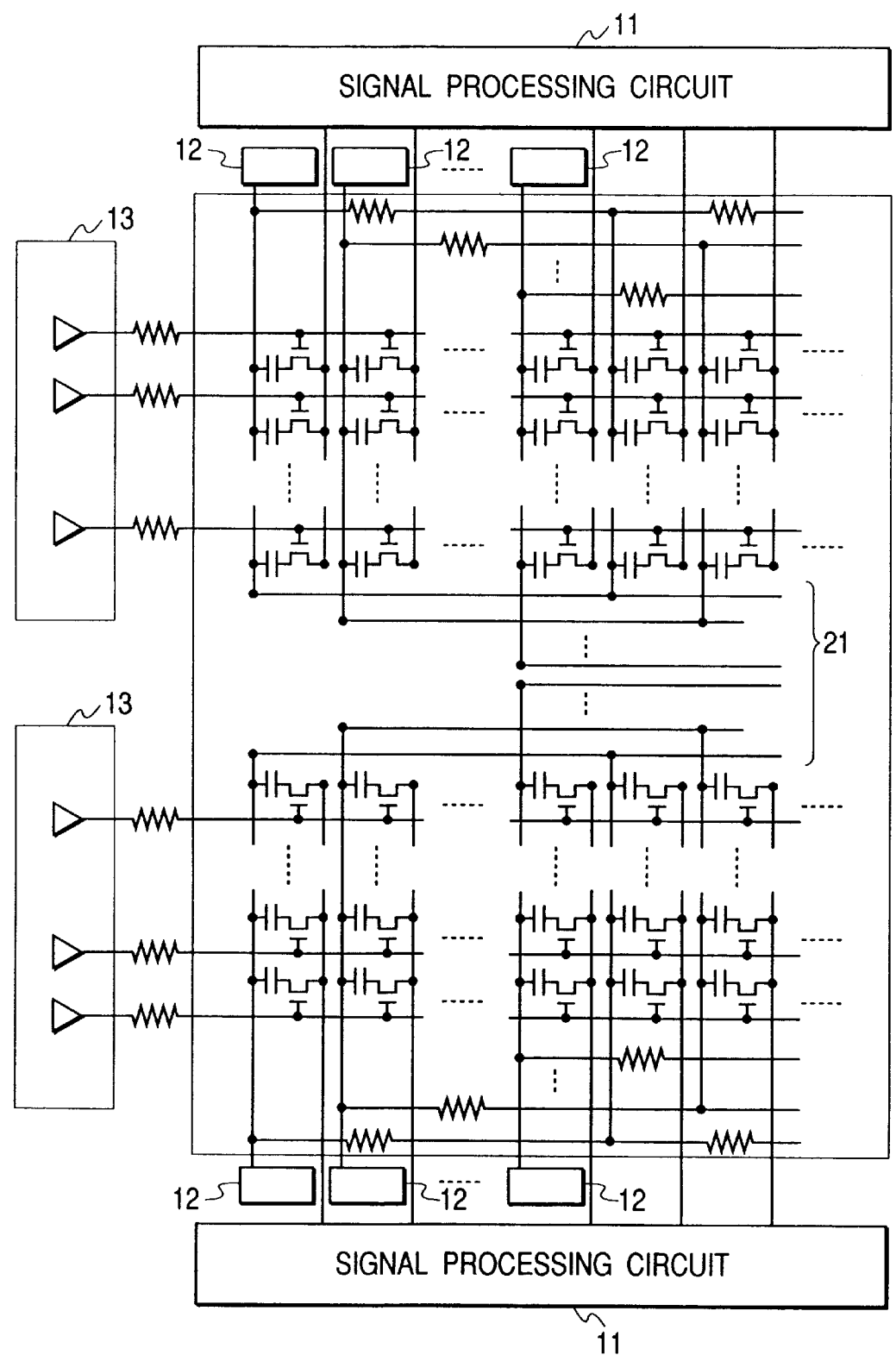
FIG. 16 is a schematic equivalent circuit diagram of an example of the semiconductor apparatus.

The present embodiment is an example in which a matrix of rows and columns of plural pixels are divided into a plurality of areas (upper and lower areas herein) in a single panel. FIG. 16 is a schematic equivalent circuit diagram of the panel. The apparatus of the present embodiment is constructed in such structure that the common electrode drivers 12 are placed on the upper and lower sides of the substrate in the figure and that the pixels are driven from the left side of the substrate in the figure. This is useful in realizing much larger area, quicker operation, and so on. In the figure, numeral 11 designates the signal processing circuit, 12 the common electrode drivers, 13 the TFT drivers, and 21 the redundant wires.

Figure 17:
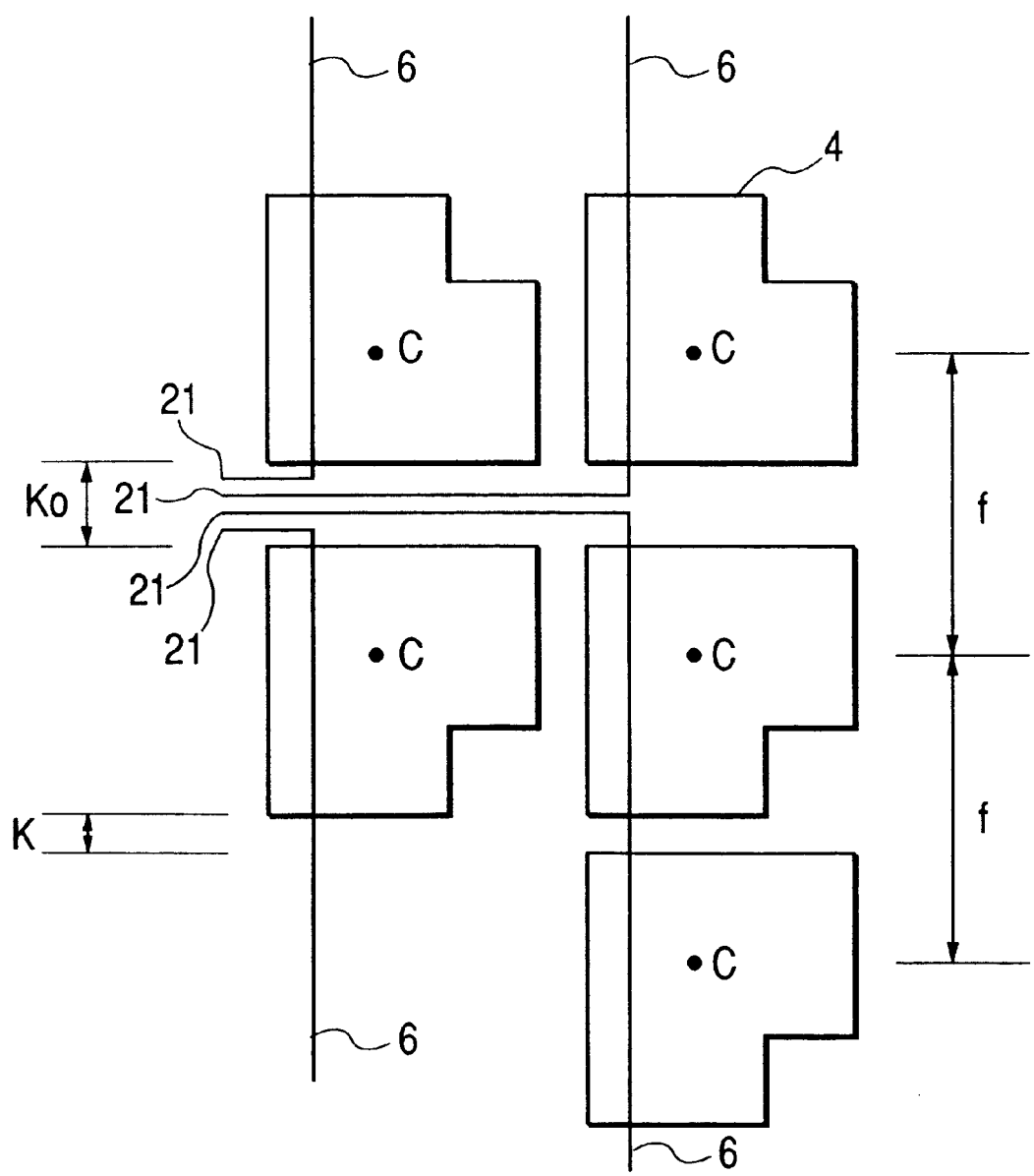
FIG. 17 is a schematic plan pattern view for explaining an example of the central part of the semiconductor apparatus.

FIG. 17 is a schematic pattern diagram to show an enlarged view of the redundant wire portion located in the central part in the vertical direction of the substrate. In the figure, points c represent the gravity centers of the sensors and f the pixel pitch. The sensors are arranged in a manner of reversing an arrangement from the center side so that the gravity centers of the sensors are at the panel center side, whereby the clearance $k_0$ can be wider than the clearance k between the sensors, thus preventing degradation of image. Therefore, the redundant wires 21 can be placed properly by making use of that space.

The photoelectric conversion apparatus of the above embodiments can be applied to detection sensors in non-destructive inspection or in X-ray inspection used for medical treatment or the like. An application will be described with an example for medical use. application to the non-destructive inspection can also be implemented by replacing a patient with an object to be inspected.

Figure 18A:
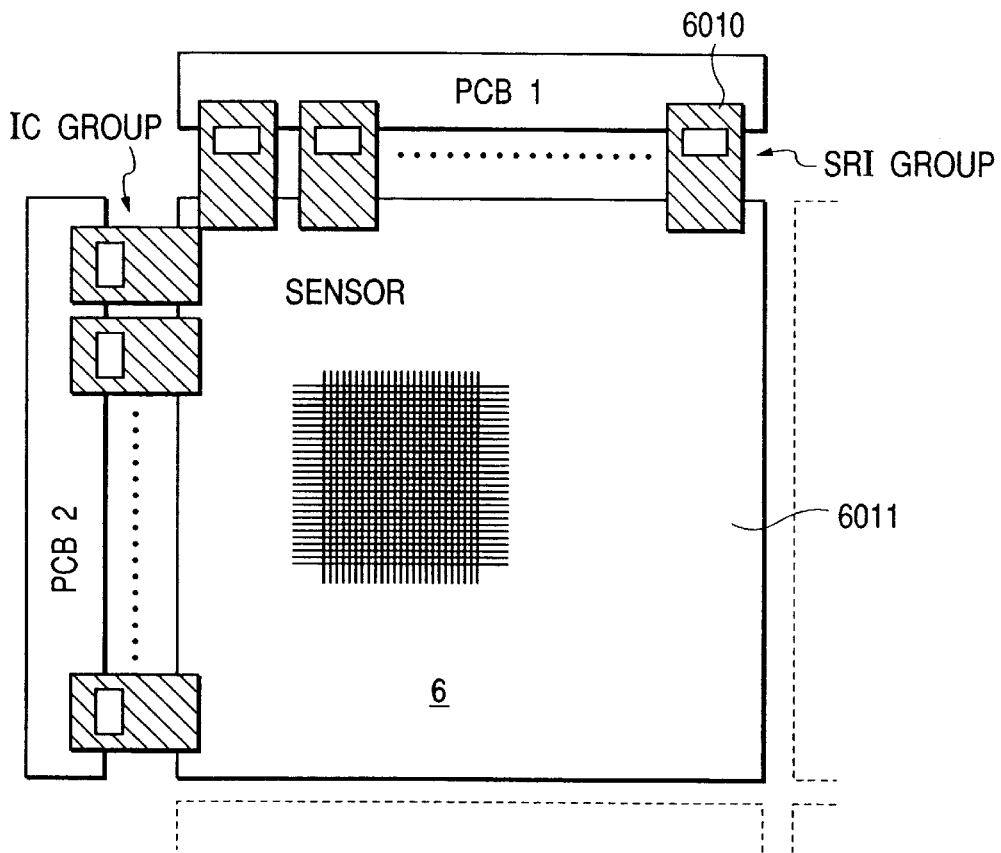
FIG. 18A is a schematic plan view of an example wherein the semiconductor apparatus is a photoelectric conversion apparatus.
Figure 18B:
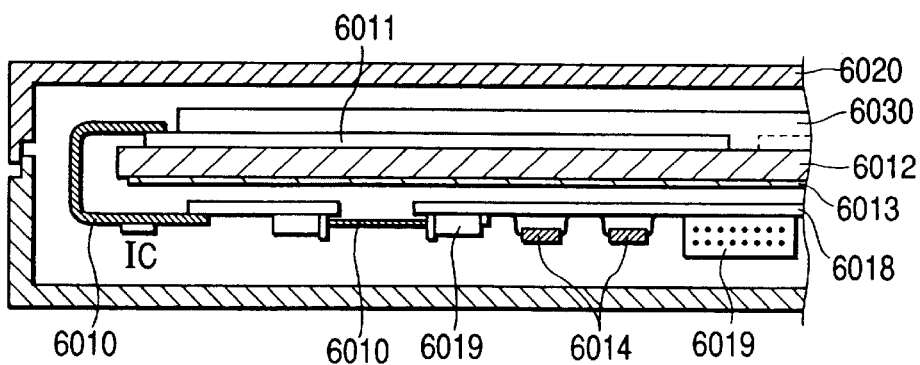
FIG. 18B is a schematic, sectional view to show an example of application to an X-ray detector where the semiconductor apparatus is the photoelectric conversion apparatus.

FIG. 18A and FIG. 18B are a schematic structure diagram and a schematic sectional diagram, respectively, of an application of the present invention to the photoelectric conversion apparatus for X-ray detection. The photoelectric conversion elements and TFTs are formed in a sensor substrate 6011 as described above, and connected to the sensor substrate 6011 are flexible circuit boards 6010 in each of which a shift register SRI or a detection integrated circuit IC is mounted. The opposite sides of the flexible circuit boards 6010 are connected to a circuit board PCB1 or PCB2. A plurality of such sensor boards 6011 or a single sensor board 6011 is bonded onto a base 6012 to form a large-scale photoelectric conversion apparatus. A lead sheet 6013 for protecting memories 6014 in a processing circuit 6018 from X-rays is mounted on the bottom surface of the base 6012. A fluorescent material 6030 as a wavelength conversion element, for example CsI, for converting X-rays to visible light is applied, evaporated, or bonded onto the sensor substrate 6011. The whole of the photoelectric conversion apparatus is stored in a carbon-fiber case 6020 as illustrated in FIG. 18B.

Figure 19:
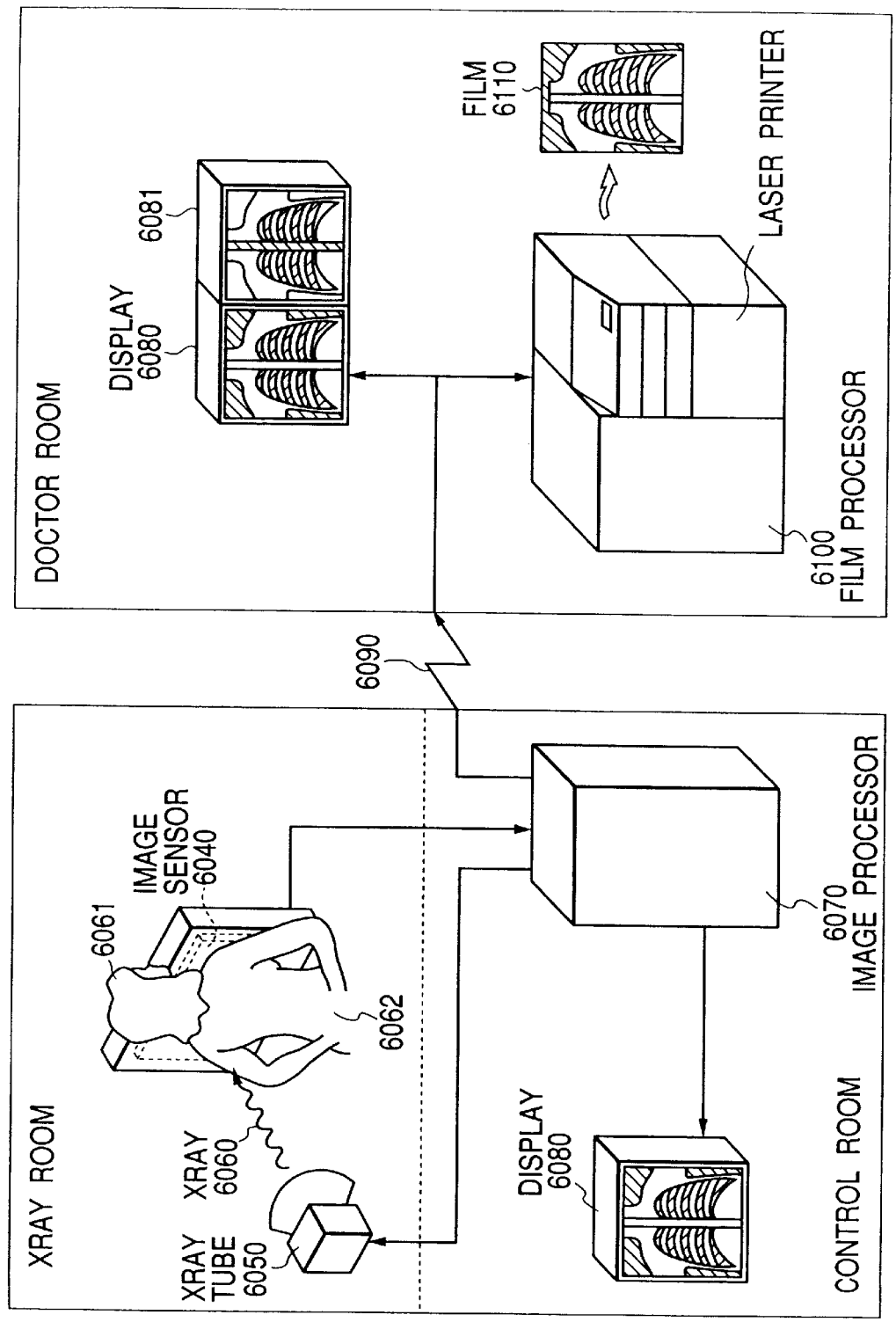
FIG. 19 is a system diagram for explaining an example of an X-ray diagnosis system.

FIG. 19 is an example of application of the photoelectric conversion apparatus of the present invention to an X-ray diagnosis system.

X-rays 6060 generated in an X-ray tube 6050 travel through the chest 6062 of a patient or subject 6061 to enter the photoelectric conversion apparatus 6040 on which the fluorescent material is mounted. This incident X-rays include information about the inside of the body of the patient 6061. The fluorescent material emits fluorescence in response to the incidence of X-rays and this fluorescence is subjected to photoelectric conversion to obtain electrical information. This information is converted to digital data and this digital data undergoes image processing by image processor 6070 so as to be observed on a display 6080 in a control room.

This information can also be transferred to a remote place via a transmission means such as a telephone line 6090 or the like to be displayed on a display 6081 or be stored in a storage means such as an optical disk or the like, for example, in a doctor room at another place or the like, and to be diagnosed by a doctor at the remote place. The information can also be recorded in a film 6110 by film processor 6100.

As described above, the ends of the bias lines are electrically connected to each other by the bias redundant wire on the opposite side to the connection side to the common electrode driver according to the present invention, whereby the yield can be prevented from being decreased by the discontinuity of wire or the short between the upper and lower metal wires in the production steps of the semiconductor apparatus having the matrix array of pixels incorporating the photoelectric conversion elements or capacitors, and the TFTS; therefore, the present invention permits the semiconductor apparatus to be produced in the good yield even with further increase in the size of panel and with further micronization of the pixel pattern.

Further, the present invention permits the semiconductor apparatus to be produced in the good yield without decreasing the aperture rate of the pixel portions of the semiconductor apparatus having the matrix array of pixels incorporating the photoelectric conversion elements or capacitors, and the TFTs.

It is noted that the same idea may also be applied to apparatus having capacitors as pixel elements except for the photoelectric conversion elements in the above embodiments. It is a matter of course that the present invention involves various modifications and combinations within the scope and the spirit of the present invention.

What is claimed is:

1. A semiconductor apparatus comprising a plurality of pixels arrayed in a matrix, each pixel comprising a capacitor or a photoelectric conversion element, and a thin film transistor connected to the capacitor or the photoelectric conversion element, said capacitor or photoelectric conversion element being comprised of a first electrode and a second electrode, said thin film transistor being comprised of a first main electrode and a second main electrode, and a control electrode for controlling electric conduction between these two main electrodes, the first electrode of said capacitor or photoelectric conversion element being connected to the first main electrode of said thin film transistor in each of said pixels, in which a control electrode line extending in a first direction of said matrix pixel array connects the control electrodes of the thin film transistors of the respective pixels in every pixel line in the first direction, in which a bias line extending in a second direction of said matrix pixel array connects the second electrodes of the capacitors or photoelectric conversion elements of the respective pixels in every pixel line in the second direction, and in which a signal transfer line extending in the second direction of said matrix pixel array connects the second main electrodes of the thin film transistors of the respective pixels in every pixel line in the second direction, wherein an end of said bias line on an opposite side to a connection side to a common electrode driver for application of a bias is electrically connected by a redundant wire to an end of another bias line on the opposite side to the connection side to the common electrode driver for application of the bias.

2. The semiconductor apparatus according to claim 1, wherein said redundant wire, bias lines, and control electrode lines are made of metal.

3. The semiconductor apparatus according to claim 1, wherein said bias lines are grouped into a plurality of series, each series is provided with a common electrode driver separately from the other series, and connection by the redundant wire is made in each series.

4. The semiconductor apparatus according to claim 1, wherein said capacitors or photoelectric conversion elements, the thin film transistors, the control electrode lines, the bias lines, the signal transfer lines, and the redundant wire are formed on an insulating substrate.

* * * * *

UNITED STATES PATENT AND TRADEMARK OFFICE
CERTIFICATE OF CORRECTION

PATENT NO. : 6,295,142 B1
DATED : September 25, 2001
INVENTOR(S) : Minoru Watanabe et al.

It is certified that error appears in the above-identified patent and that said Letters Patent is hereby corrected as shown below:

Title page, Item [54] and Column 1, line 2,
Title, "IT" should read -- SAME --; and Title page,
Item [56], References Cited, FOREIGN PATENT DOCUMENTS,
"11-2357-68" should read -- 11-235768 --.

Drawings,
Sheet 19 of 19, FIG. 19, "XRAY" (each occurrence) should read -- X-RAY --.

Column 1,
Line 31, "are increasing their" should read -- have been increased in --; and
Line 50, "wires" should read -- wires; and --.

Column 2,
Line 19, "$C_{11}, C_{12},..., C_{21}, C_{22},..., C_{5n}$" should read -- c11, c12,..., c21, c22,..., c5n --;
Line 20, "$t_{11}$," should read -- t11, --;
Line 21, "$t_{12},..., t_{21}, t_{22},..., t_{5n}$" should read -- t12, ..., t21, t22,..., t5n --; and
"$V_{s1}, V_{s2},..., V_{s5}$" should read -- Vs1, Vs2,..., Vs5 --;
Line 25, "tmn)" should read -- t5n) --;
Line 32, "cmn" should read -- c5n --; and
Line 37, "cmn)" should read -- c5n) --.

Column 6,
Line 9, "cmn)" should read -- c5n) --; and
Line 20, "cmn" should read -- c5n --.

Column 8,
Line 28, "(R1" should read -- (R1, --;
Line 50, "tmn)" should read -- t5n) --;
Line 56, "cmn" should read -- c5n --; and
Line 60, "cmn)" should read -- c5n) --.

Column 9,
Line 2, "cmn" should read -- c5n --.

Column 10,
Line 18, "he" should read -- the --; and
Line 36, "word" should read -- w or d --.

UNITED STATES PATENT AND TRADEMARK OFFICE
CERTIFICATE OF CORRECTION

PATENT NO. : 6,295,142 B1
DATED : September 25, 2001
INVENTOR(S) : Minoru Watanabe et al.

It is certified that error appears in the above-identified patent and that said Letters Patent is hereby corrected as shown below:

Column 11,
Line 3, "application" should read -- Application --.

Column 12,
Line 53, "separately from the" should read -- different from that of each --.

Signed and Sealed this

Sixteenth Day of March, 2004

JON W. DUDAS
*Acting Director of the United States Patent and Trademark Office*